Sept. 17, 1940.     H. R. MILNES     2,215,332

THERMAL GENERATION OF ELECTRIC CURRENT

Filed Sept. 10, 1938

Henry Reginald Milnes
INVENTOR

By Otto Munk
his ATTY.

Patented Sept. 17, 1940

2,215,332

UNITED STATES PATENT OFFICE 2,215,332

THERMAL GENERATION OF ELECTRIC CURRENT

Henry Reginald Milnes, Bingley, England, assignor to Leonard Beaumont Smith, Bradford, England Application September 10, 1938, Serial No. 229,252
In Great Britain August 19, 1938

5 Claims. (Cl. 136—4)

This invention relates to the thermal generation of electric current.

In application Serial Number 163,809 there is described novel thermo-electric elements made of compositions comprising the metals copper and silver alloyed together and impregnated with selenium. For practical success, the thickness of such thermo-electric elements should not exceed ⅛ of an inch, and to ensure good heat conductance as well as a good electrical connection each element is engaged by metal members which are spring-urged into close contact therewith (as described in my copending application Ser. No. 163,810).

Now, the effect of these springs, which must be fairly strong, is to cause the respective elements to splay with disadvantageous results and damage thereto. This is particularly the case with the negative element which is softer due to the higher content of silver.

On the other hand, it is desirable that the elements are relatively soft as thereby they engage better with the heat conveying and heat removing metal members.

An object of the present invention is to avoid the disadvantage due to the springs without altering the composition or hardness of the thermo-electric generator element and without affecting their current generating properties.

Another object of the invention is to provide novel or improved apparatus for converting heat energy into electrical energy employing, for example, positive and negative thermo-electric generator elements.

In order that the invention may be clearly understood and readily carried into effect, the same is hereinafter more fully described with reference to the accompanying diagrammatic drawing which is given by way of example only and not of limitation.

Figure 1:
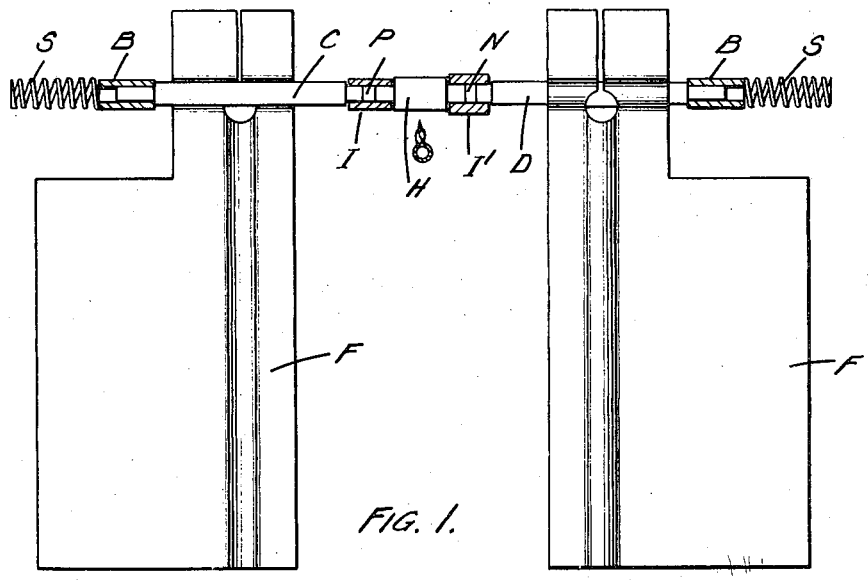
Figure 1 is a side elevation partly in section of a generator unit including positive and negative elements.

Referring now to the said drawing and more particularly to Fig. 1, a positive element P comprising a copper-silver alloy in which copper predominates impregnated with selenium, and a negative element N comprising a silver copper alloy in which silver predominates impregnated with selenium are disposed one on each side of a heater member H which is desirably composed of nickel, nickel alloy or other suitable metal heated in any convenient manner as by an oil or gas flame. The element H is formed in two diameters with the portions of smaller diameter at the end thereof. The positive element P is engaged by a copper conductor C whilst the element N is engaged by a similar element D on both of which elements are provided cooling fins F. Insulated bushes B are provided on the ends of the elements C and D and these bushes are engaged by springs S, the arrangement being such that the several elements are strongly clamped together. When a member H is heated, an electric current is generated in the thermo-couple constituted by the two elements P and N disposed on opposite sides of the heated member H.

Around the elements P and N are arranged sleeves or bushes I, I¹ made of ceramic material such as porcelain which encompass the elements and extend over the portions of smaller diameter of the elements C and D. The tubes are desirably as thin as possible consistent with proivding sufficient strength to prevent splay of the elements P and N and should also as far a possible retard the flow of heat from the element H to the elements C and D.

The thermo-electric generator elements P and N are preferably not more than one eighth of an inch in thickness and of cylindrical shape and they may have different diameters to preclude errors in assembling the apparatus. Thus, the diameter of the bore in the sleeve or bush I is smaller than that in the sleeve I¹ whilst the portions of reduced diameters of the contacting elements C, H and D are appropriately dimensioned.

The insulating tubes may be strengthened externally in any convenient manner as by binding with wire or enclosing them in metal sleeves, or, instead of making them of ceramic material they may be metallic, for example, made of nickel, suitably oxidized internally to make them insulating.

Figure 2:
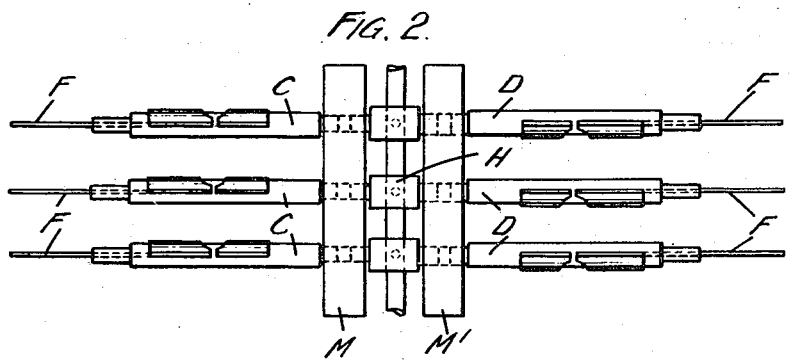
Figure 2 is a plan view of a battery of generators with associated restraining means.
Figure 3:
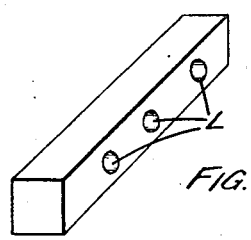
Figure 3 is a perspective view of restraining means as shown in Figure 2.

According to a modification of the apparatus in which like parts are denoted by like reference letters, there is shown in Figure 2 of the drawing a plan view of three units arranged as a battery. In this case, instead of enclosing the positive and negative thermo-electric generator elements P and N in sleeves, they are confined in bores L provided in strips M, M¹ of insulating material such as asbestos, cement or the like. In this case also, the strip is sufficiently wide to extend partially over the portions of reduced diameter of the members C, H and D, whilst the bores in the strip M¹ are somewhat larger to accommodate the larger diameter element N and the portions of reduced diameter of the members H and D.

Conductors for taking off the current generated are connected to the members C and D and in the embodiment shown in Figure 2 conductors may connect the respective units to combine them in either parallel or series arrangement.

I claim:

1. A device for converting heat energy into electric energy comprising a positive thermo-electric generator element, a negative thermo-electric generator element, a metallic member for conveying heat to one side of each of said thermo-electric generator elements, metallic means on the opposite sides of said thermo-electric generator element for cooling said sides, resilient means urging said elements into close contact with the heat conveying member, and rigid insulating means encompassing the individual thermo-electric generator elements to prevent splaying thereof.

2. A device for converting heat energy into electric energy as set forth in claim 1, in which the individual thermo-electric elements have a cylindrical shape and said means for preventing splaying of the thermo-electric generator elements comprise sleeves of insulating material disposed around the respective elements.

3. A device for converting heat energy into electric energy as set forth in claim 1, in which the means for preventing splaying of the thermo-electric generator elements comprise insulating bushes made of ceramic and like materials.

4. A device for converting heat energy into electric energy as set forth in claim 1, in which the means for preventing splaying of the thermo-electric generator elements comprise a metallic sleeve oxidized internally to make it insulating.

5. A battery of devices as set forth in claim 1, in which the rigid means comprise strips of insulating material provided with bores in which at least the thermo-electric generator elements are located.

HENRY REGINALD MILNES.